US005298740A

United States Patent [19]

Ayral et al.

[11] Patent Number: 5,298,740

[45] Date of Patent: Mar. 29, 1994

[54] FREQUENCY CORRELATOR HAVING A NON-LINEAR OPTICAL FIBER

[75] Inventors: Jean-Luc Ayral, Antony; Daniel Dolfi, Orsay; Jean-Pierre Huignard, Paris, all of France

[73] Assignee: Thomson-CSF, Puteaux, France

[21] Appl. No.: 953,852

[22] Filed: Sep. 30, 1992

[30] Foreign Application Priority Data

Oct. 1, 1991 [FR] France ............................ 91 12040

[51] Int. Cl.[5] ............................................ G03H 1/16

[52] U.S. Cl. ........................ 250/227.11; 250/227.21; 385/122; 359/326

[58] Field of Search ............................ 356/345, 349; 250/227.11, 227.23, 227.21, 227.27; 359/326, 332; 385/5, 42, 122

[56] References Cited

FOREIGN PATENT DOCUMENTS 0299840 1/1989 European Pat. Off. .

OTHER PUBLICATIONS

Optical Engineering, vol. 21, No. 2, Mar. 1992, pp. 237-242, T. R. O'Meara, "Time-Domain Signal Processing via Four-Wave Mixing in Nonlinear Delay Lines".

*Primary Examiner*—Samuel A. Turner
*Assistant Examiner*—Robert Kim
*Attorney, Agent, or Firm*—Oblon, Spivak, McClelland, Maier & Neustadt

[57] ABSTRACT

A non-linear optical fiber receives two light waves by its two ends, each light wave being modulated by means of two modulators. These light waves create photoinduced index variations in the fiber which are proportional to the intensity of the optical field. A reading source emits a reading wave in the fiber. This reading wave is reflected at least partially by the index variation or variations. A detector receives the reflected wave and makes it possible, through the computation of the returning time of the wave, to determine the position of the index variations. Applications: very wide passband signal correlators.

6 Claims, 3 Drawing Sheets

FREQUENCY CORRELATOR HAVING A NON-LINEAR OPTICAL FIBER

BACKGROUND OF THE INVENTION

The invention relates to a frequency correlator and, more particularly, to a correlator of electrical signals.

The invention is applicable notably to an information-processing device that correlates very wide band (typically 1 to 20 GHz) signals. This device, which uses the non-linear optical properties of monomode optical fibers (the Kerr effect) is particularly well suited to the processing of signals having a wide instantaneous passband. This invention is based on a spatial integration of optical non-linearities induced in a monomode fiber. It can be extended to the making of wideband programmable filters.

SUMMARY OF THE INVENTION

The invention therefore relates to a frequency correlator comprising:

a monomode optical fiber having a non-linearity, possessing a first end and a second end;

at least one first light source emitting a first light wave;

a first light modulator receiving the first light wave, modulating it under the control of a first control signal to be correlated and transmitting this first modulated light wave to the first end of the optical fiber;

a second light modulator receiving the first light wave, modulating it under the control of a second control signal to be correlated and transmitting this second modulated light wave to the second end of the optical fiber;

a second light source emitting a reading light beam in the optical fiber by one of its ends, the first end for example;

an intensity detector coupled to the same end of the fiber as the second light source, namely the first end in the chosen example.

BRIEF DESCRIPTION OF THE DRAWINGS

The different objects and characteristics of the invention shall emerge more clearly in the following description and in the appended figures, of which.

BRIEF DESCRIPTION OF THE DRAWINGS

Figure 1A:
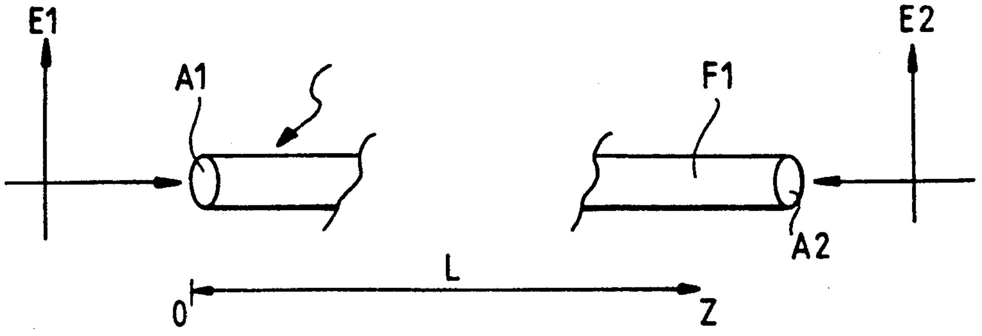
FIGS. 1*a* and 1*b* show simplified exemplary embodiments of the device of the invention.
Figure 1B:
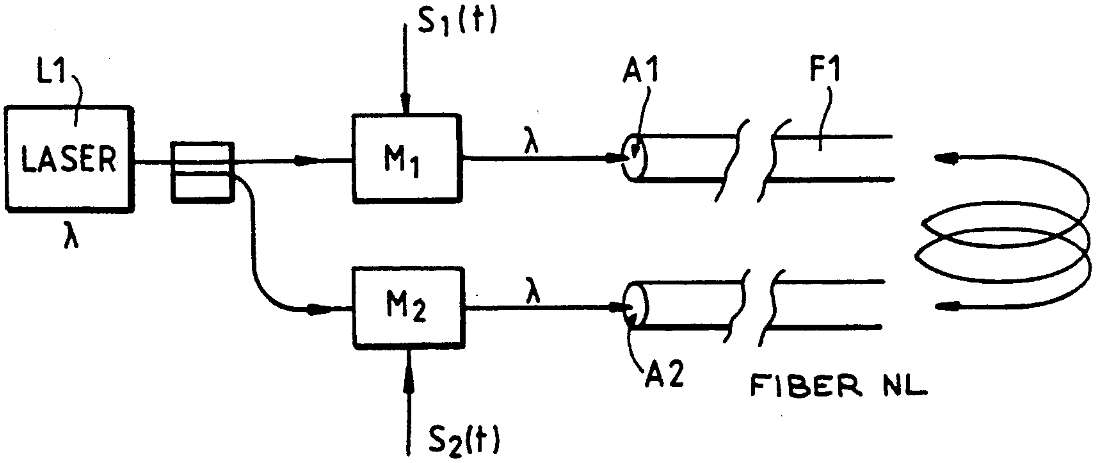

FIGS. 1*a* and 1*b* show drawings of the correlation device which is an object of the invention. This device uses a monomode fiber F1 that shows a 3rd order non-linearity. This is a fiber in which a photoinduced variation in index is proportional to the intensity of the optical field in the core of the fiber. As shown in FIG. 1*a*, the fiber F1 receives two optical waves through its two ends A1, A2, the incident optical fields of these two optical waves being perpendicular to the axis of the fiber F1. According to figure lb, two signals to be correlated $S_1(t)$ and $S_2(t)$ are transposed to an optical beam with a frequency $\omega_o$ by means of wide-band luminous intensity modulators referenced $M_1$ and $M_2$. These modulators may be made by the known techniques of integrated optics.

The modulated beams E1 and E2 are transmitted to the ends A1 and A2 respectively of the fiber.

The optical fields at each end of the fiber are written as:

$$E_1(t) = E_{10}\sqrt{S_1(t)}\ \exp j\omega_o t$$

$$E_2(t) = E_{20}\sqrt{S_2(t)}\ \exp j\omega_o t$$

At any point of the fiber having a coordinate value z, and at the instant t, the expressions of the fields $E_1$ and $E_2$ are respectively written as:

$$E_1(z,t) = E_{10}\sqrt{S\left(t-\frac{z}{v}\right)\ \exp j\omega_o\left(t-\frac{z}{v}\right)}$$

$$E_2(z,t) = E_{20}\sqrt{S_1\left(t-\frac{L-z}{v}\right)\ \exp j\omega_o\left(t-\frac{L-z}{v}\right)}$$

where:

v=C/n is the velocity of light in the fiber,

L is the length of the fiber.

The variation of the index at a point having a coordinate value z is given at any instant t by the Kerr optical effect, namely:

$$\begin{aligned}\Delta n(z,t) &= n_2|E_1(z,t)+E_2(z,t)|^2\\ &= n_2(|E_1|^2+|E_2|^2+E_1E_2^*+E_1^*E_2)\end{aligned}$$

The first two terms of $\Delta n$, $|E_1|^2$ and $|E_2|^2$, lead to a modulation of $\Delta n$, proportional to $S_1(t-z/v)$ and $S_2(t-(1-z)/v)$, the pitch of which is that of the microwave (5 mm for 20 GHz) far greater than that produced by the terms $E_1E_2$ and $E_1E_2$. The effective variation in index is therefore given by:

$$\begin{aligned}\Delta n_{eff}(z,t) &= n_2(E_1E_2^*+E_1^*E_2)\\ &= 2n_2E_{10}E_{20}\sqrt{S_1\left(t-\frac{z}{v}\right)S_2\left(t-\frac{L-z}{v}\right)}\cos\left(\omega_o\frac{L-2z}{v}\right)\end{aligned}$$

$\Delta n_{eff}(z,t)$ is therefore a stationary index grating with a spatial period $\Lambda=\lambda/2n$, the amplitude of which is modulated by the term produced:

$$\sqrt{S_1\left(t-\frac{z}{v}\right)S_2\left(t-\frac{1-z}{v}\right)}$$

Figure 2:
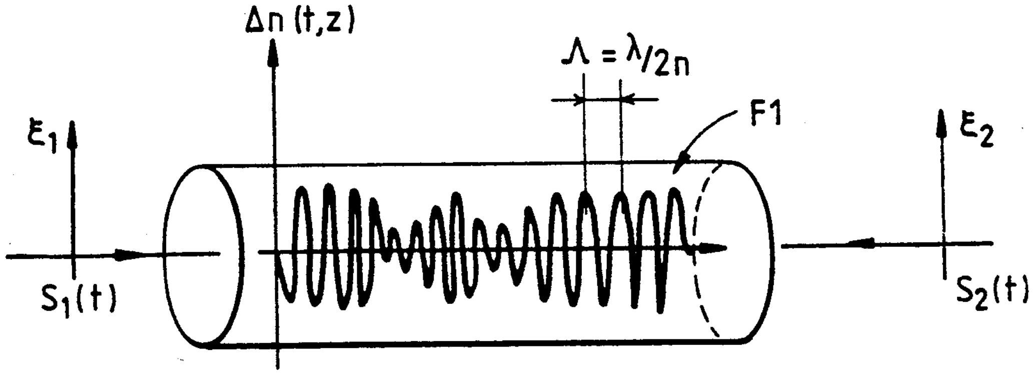
FIG. 2 is an explanatory drawing of the device of the invention.

The fiber is therefore the seat of photoinduced variations in index by the interference of the modulated optical signals. These variations in index are illustrated in FIG. 2 where $\Delta n(t,z)$ shows the amplitude of the photoinduced grating and $\Lambda$ represents the spatial period of the photoinduced index grating.

According to an exemplary embodiment, the signals $S_1(t)$ and $S_2(t)$ to be correlated are electrical signals, and the modulators $M_1$, $M_2$ are electrooptical modulators.

Figure 3:
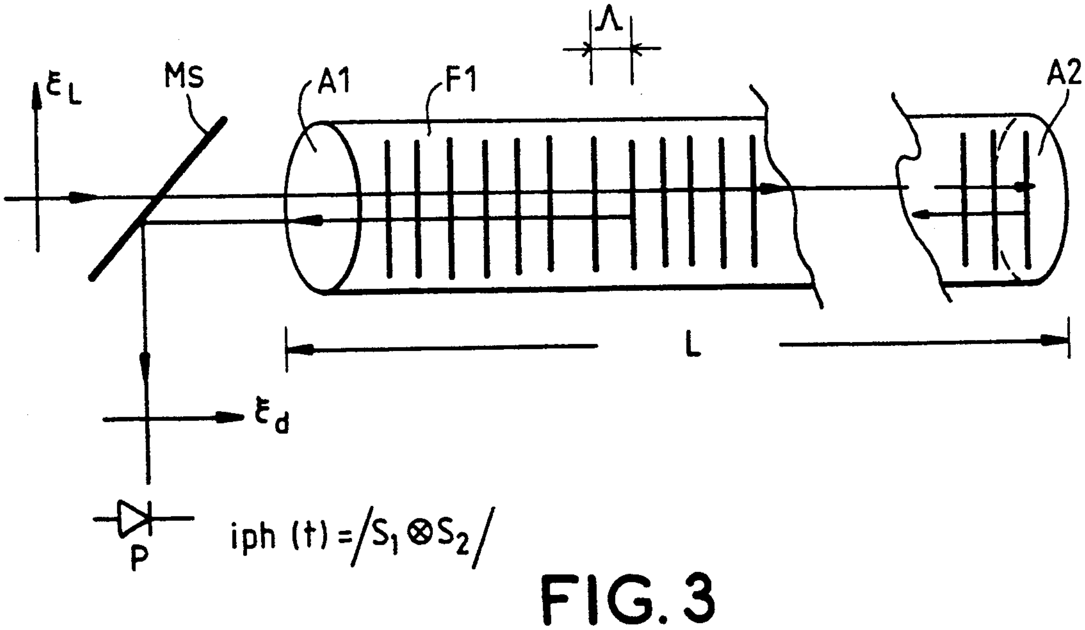
FIG. 3 shows a detailed view of an embodiment of the device of the invention.

FIG. 3 shows the optical fiber F1 in which a grating of indices has been recorded by the interference of the modulated optical fields transmitted to the inputs A1 and A2. An optical reading beam ($E_L$) is transmitted to an input Al of the fiber M. This transmission can be done by means of a semi-reflecting mirror MS. The optical beam is reflected partly by the photoinduced index grating. The reflected flux $E_d$ is sent by the mirror MS towards a photodetector $P^d$.

The reading beam $E_L$ has the same wavelength $\lambda$ as the modulated beams $E_1$ and $E_2$. Its intensity $I_o$ is proportional to $E^2$.

Each elementary portion of fiber with a length dz (taken as being equal to $c/\sqrt{\epsilon} f_{RF}$ where $f_{RF}$ is the maximum frequency of the microwave signals) with the abscissa value z leads, at each instant t, to a coefficient of reflection R, determined in amplitude, of the probe wave $E_o$.

The reading should be done with a laser, the coherence length of which is equal to dz, so that the integration on the total length of the fiber takes place in intensity. This length dz corresponds to a wavelength of coherence equal to the inverse value of the maximum value of the frequencies to the processed. In this case, the reflection of the probe beam, in intensity, is given by:

$$R_{(t)} = \sum_{z=o}^{L} |R(z, dz, t)|^2$$

$$= n_2^2 \left(\frac{E_{10}E_{20}}{2n}\right)^2 \sum_z S_1\left(t - \frac{z}{v}\right) S_2\left(t - \frac{1-z}{v}\right)$$

$$\text{Doing} \sum_z S_1\left(t - \frac{z}{v}\right) S_2\left(t - \frac{L-z}{v}\right)$$

amounts to doing:

$$R(t) = \int S_1\left(t - \frac{z}{v}\right) S_2\left(t - \frac{L-z}{v}\right) dz$$

$$= \int S_1(t - t') S_2\left(t - \frac{L}{v} + t'\right) dt' \cdot v$$

$$= \int S_2\left(t' + t - \frac{L}{v}\right) S_1(t - t') dt' v$$

This is the correlation product at the instant t of the signals $S_2(t')$ (delayed by L/v) and $S_1(-t')$.

In order to achieve the desired product of correlation efficiently in the fiber, it is necessary to temporally reverse one of the two signals (t' becomes −t'), in a manner similar to what is done in the case of an acousto-optical correlator with two Bragg cells.

The intensity of the backscattered probe, and hence the current of the photodetector, is directly proportional to the product of correlation of the two signals $S_1$ and $S_2$.

Figure 4:
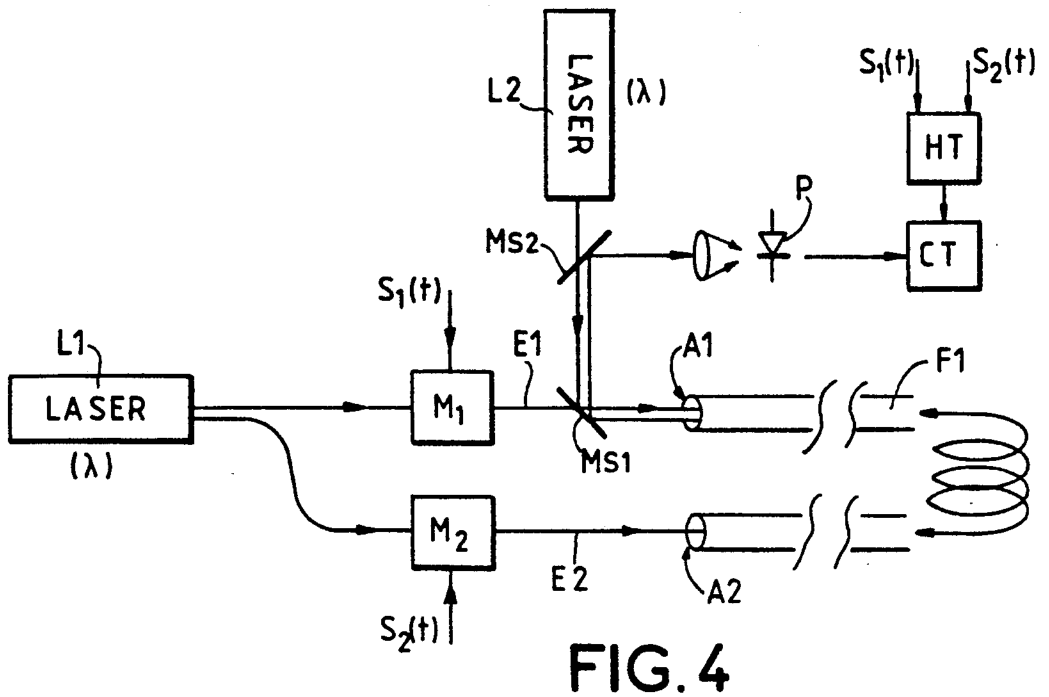
FIG. 4 shows a detailed view of an exemplary embodiment of the device of the invention.

FIG. 4 shows a detailed view of an exemplary embodiment of the device of the invention.

This device has a light source L1 (laser) emitting a beam of coherent light with a wavelength $\lambda$. This beam is transmitted to two electrooptical modulators M1, M2 which modulate the light received from the source L1, by means of electrical signals $S_1$ (t) and $S_2$ (t) to be correlated. The modulated beams E1 and E2 are transmitted to the ends A1 and A2 of the fiber F1. The two beams E1 and E2 interfere in the fiber F1 and give rise to the creation of one or more index gratings in the fiber 1.

Furthermore, a second light source L2 emits a light beam having the same wavelength $\lambda$ but a small coherence length corresponding to the inverse value of the maximum frequency to be correlated. This beam is transmitted by two semi-reflecting mirrors MS1 and MS2 to the input A1 of the fiber. It is reflected by the photoinduced index gratings. The reflected beam or beams are retransmitted by the mirrors MS1 and MS2 towards a luminous intensity detector P which thus identifies the correlation peaks.

To localize the position of the correlation peaks in time, a time clock HT is put into operation at the instant of application of the signals $S_1$ (t) and $S_2$ (t) to be correlated. When a correlation peak is detected, the detector P informs a processing circuit which notes the position of the time clock. The system can thus know the position of each correlation peak detected with respect to the start of the signals $S_1(t)$ and $S_2(t)$, namely the position of each correlation peak inside the signals $S_1(t)$ and $S_2(t)$.

In an exemplary embodiment, the modulators enable a very wide band modulation (from 1 to 20 GHz for example) and may be made by integrated optics technology. A system such as this enables a memorizing of pulses with a duration of 5 μs on a one-km fiber, which enables the correlation of signals with a duration of 5 μs. According to another example, on five meters of fiber, it is possible to correlation 25 ns signals.

As an example, the components used may be the following:

- Recording laser L1:
  - Monomode-monofrequency diode pumped YAG laser
  - $P_i$ =200 mW−$\lambda$=1.32 μm (where $\lambda$=1.55 μm−DFB laser)
- Reading laser L2:
  - diode pumped YAG laser $\lambda$=1.32 μm (where $\lambda$=1.55 μm−DFB laser)
- Monomode optical fiber F1:
  - Silica core $\phi_{core}$=5 μm
- Modulators $M_1$-$M_2$
  - $LiNbO_3$ or KTP integrated modulators (commercially available)
  - Passband 0→20 GHz
- Means for the coupling and spatial separation of the beams (MS1, MS2)
  - Integrated optical couplers
  - Monomode fiber couplers
- Non-linear effect in the monomode fiber $SiO_{20}$-$GeO_2$
  - Density of power in the fiber $\phi_{core}$=5 μm I=1 MW $cm^{-2}$
  - Variation in index induced by Kerr effect $$n = n_o + n_2 I$$

$$n_2 \sim 10^{-9}\ cm^2/MW$$

giving $n = n_o + 10^{-9} \times I$ (MW/cm²)

Maximum reflectivity:

$$R_{max} = \left(\frac{n_2 E_{10} E_{20}}{2n}\right)^2 \times \frac{L}{dz} = 10^{-4} \text{(for 1000 channels)}$$

in which L/dz represents the number of channels of the signals to be correlated.

Figure 5:
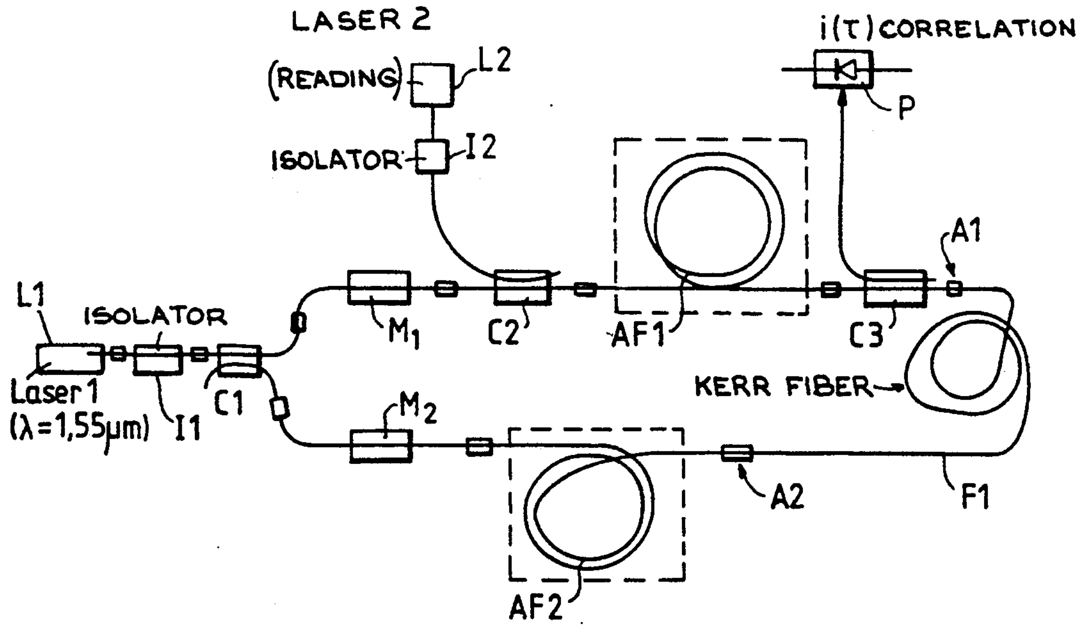
FIG. 5 shows a detailed view of an alternative embodiment of the device of the invention.

FIG. 5 shows a wideband correlator with amplification of the optical signals transmitted to the fiber F1. Furthermore, the device of FIG. 1 comprises elements which complete the invention.

This figure again shows the laser L1 which emits a light beam towards the modulators M1 and M2 which transmit modulated beams to the modulator F1.

An isolator I1 prohibits any return of the light towards the source L1.

The transmission of the beam emitted by the source L1 to the modulators M1 and M2 is done by a coupler C1 which can be made by integrated optics technology. The beams modulated by the modulators M1 and M2 are amplified by fiber amplifiers AF1 and AF2. For example, each of these amplifiers comprises an erbium-doped fiber.

The reading laser L2 is coupled to the optical path of the beam modulated by the modulator M1, between the modulator M1 and the amplifier AF1, so that the reading beam benefits from the amplification by the amplifier AF1. This coupling is done by an isolator I2 and a coupler C2 (made by integrated optics technology for example).

The detector P is coupled to the access A1 of the F1 by a coupler C3 (which can be made by integrated optics technology). Although it is not shown, an amplifier may also be provided between the detector P and the coupler C3.

This device makes it possible to carry out the modulation at low level and then to adjust the optical intensity to the level necessary to generate a sufficient variation in index by Kerr effect. Amplification gains of 20 to 30 dB for 30 meters of fiber can be achieved in the fiber amplifiers, which are for example erbium-doped, operating at 1.55 μm.

The device of the invention enables very compact manufacture through the use of the techniques of integrated optics. Furthermore, the amplifiers may be made as semiconductor-based amplifiers.

The device of the invention can also be applied to a programmable filter.

For, it is possible to optically generate a programmable coefficient on each component of the product $$|R(z, dz, t)|^2 a S_1\left(t - \frac{1-z}{v}\right) \times S_2\left(t - \frac{1-z}{v}\right)$$

in order to achieve the following function at output:

$$R'(t) = n_2^2 \left(\frac{E_{10} E_{20}}{2n}\right)^2 \sum_z a(z, t) S_1\left(t - \frac{z}{v}\right) S_2\left(t - \frac{1-z}{v}\right)$$

This is obtained by the amplitude modulation of the reading beam $I_o$ in such a way that:

$$a(z, t) = \left|\frac{E_o(z, t)}{E_o}\right|^2$$

Thus a wide-band (0–20 GHz) and programmable filter is obtained.

This reflectivity on a fiber length of 5 m enables the use of a probe laser with a coherence length of 5 mm working at a wavelength of 1.32 μm under power of some tens of mW.

The device according to the invention enables the correlation of very wide passband signals, which makes it particularly well suited to radar applications. The specific characteristics of the device are recalled here below:

the non-linearity is induced optically by Kerr effect in a monomode optical fiber (response time of the effect less than $10^{-12}$ s.

the correlation of the two signals is done by spatial integration along the fiber with a length L.

the fiber length is adapted to the duration of the two signals to be processed ($L \approx = 2$ c/n T).

the laser sources used are of the monomode type (with a small line width)

$L_{coh} > 2L_{fiber}$ for the modulated recording laser $L_{coh} = C/2nf_{RF}$ for the reading laser The signals are transferred to the optical wave by means of wideband modulators.

It is quite clear that the above description has been given purely by way of an example and that other variants may be contemplated without going beyond the scope of the invention. The examples of numerical values and of materials or of components used have been given purely in order to illustrate the description.

What is claimed is:

1. A frequency correlator comprising:

a monomode optical fiber having a non-linearity, possessing a first end and a second end;

at least one first light source emitting a first light wave;

a first light modulator receiving the first light wave, modulating it under the control of a first control signal to be correlated and transmitting this first modulated light wave to the first end of the optical fiber;

a second light modulator receiving the first light wave, modulating it under the control of a second control signal to be correlated and transmitting this second modulated light wave to the second end of the optical fiber;

a second light source emitting a reading light beam in the optical fiber by either one of its ends.

an intensity detector coupled to the same end of the fiber as the second light source.

2. A correlator according to claim 1, wherein the second light source has a coherence width substantially equal to the inverse value of the maximum value of the frequencies of the signals to be correlated.

3. A correlator according to claim 1, wherein the first light wave emitted by the first light source has a wavelength substantially equal to that of the reading beam emitted by the second light source.

4. A correlator according to claim 1, comprising a time clock detecting the instants of reception of the signals to be correlated by the modulators and giving the instants of detection, by the detector, of each correlation peak.

5. A correlator according to claim 4, comprising a processing circuit receiving, from the time clock, the time of reception of the signals to be correlated and the time of detection, by the detector, and thus computing the position of time of each correlation peak in each signal to be correlated.

6. A correlator according to claim 1, wherein the signals to be correlated are electrical signals and wherein the modulators are electrooptical modulators.

* * * * *